T. J. WILLIAMS.
CHAIN OR CHAIN LINK.
APPLICATION FILED JUNE 16, 1909.
977,355.
Patented Nov. 29, 1910.
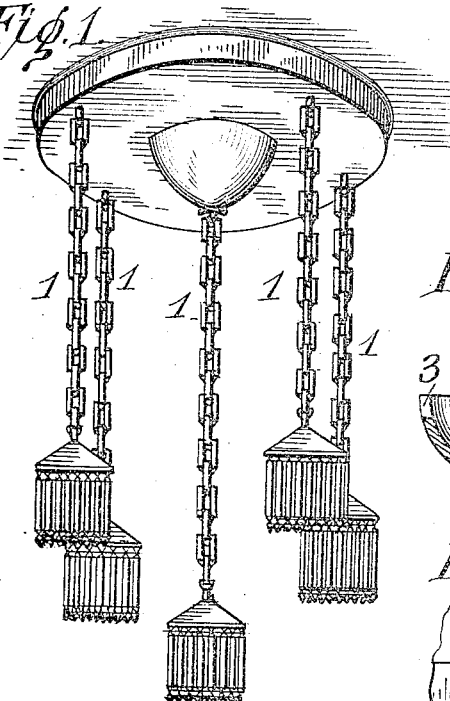
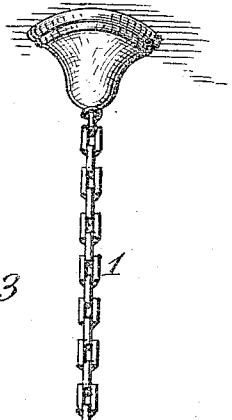
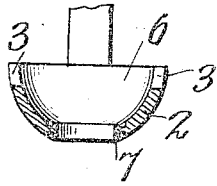
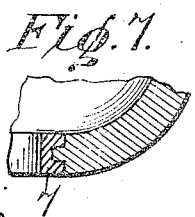
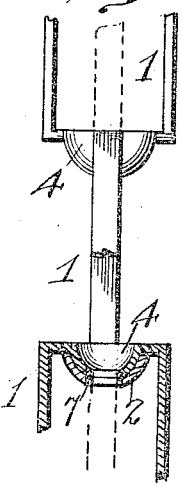
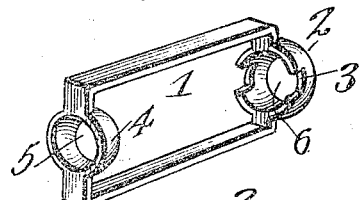
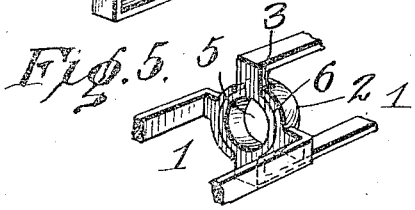
Thomas J. Williams, Inventor.
Witnesses

UNITED STATES PATENT OFFICE.

THOMAS J. WILLIAMS, OF WASHINGTON, DISTRICT OF COLUMBIA, ASSIGNOR OF ONE-HALF TO JAMES MARTIN, OF WASHINGTON, DISTRICT OF COLUMBIA.

CHAIN OR CHAIN-LINK.

977,355.

Specification of Letters Patent.

Patented Nov. 29, 1910.

Application filed June 16, 1909. Serial No. 502,620.

*To all whom it may concern:*

Be it known that I, THOMAS J. WILLIAMS, a citizen of the United States, residing at Washington, District of Columbia, have invented certain new and useful Improvements in Chains or Chain-Links, of which the following is a specification, reference being had therein to the accompanying drawing.

This invention relates to chains especially adapted for hanging or drop lights, and the principal object of the invention is to provide a chain of the type specified, which serves as a guide and protector for a conductor wire or pipes for such lights.

In carrying out the object of the invention generally stated above, it is contemplated employing a chain, preferably formed of open links, one end of which projects inwardly and the other end projects outwardly, said ends form, respectively a ball and a socket, whereby the links may be connected.

It will be understood, of course, that in the practical application of the invention the essential features thereof are susceptible of changes in details and structural arrangements but a preferred and simple embodiment thereof, is shown in the accompanying drawings, wherein:

Figure 1 is a perspective view of a cluster of drop lights, each light thereof being supported by the improved chain. Fig. 2 is a similar view of a single light supported by the improved chain. Fig. 3 is a detail view in side elevation, partly in section, showing the connection between the links and the chain. Fig. 4 is a detail perspective view of one of the links. Fig. 5 is a fragmentary perspective view showing two of the links connected. Fig. 6 is a fragmentary sectional view of the socket member of one of the links. Fig. 7 is a similar view on an enlarged scale.

Referring to the drawings, it will be seen that the improved chain is composed of a plurality of open links 1, one end of which is provided with an outwardly projecting concave portion, forming a socket member 2, the inner edge of which is provided with oppositely-disposed recesses 3, the other end of the link is provided with an inwardly-projecting rounded portion 4 forming a ball. Said ball member is supported centrally of one end of the link, and is provided with an opening 5, which alines with a similar opening 6 formed through the socket member 2.

The ball member of the link is of a smaller size than the socket end, so that when the links of the chain are assembled the said ball member will fit within the socket member, as shown in Figs. 3 and 5 with the recesses of the socket member 3 engaging over the end of the link, which supports the ball member 4, so as to form a ball and socket joint between each link, which permit the said links to have a limited-relative movement to impart the necessary flexibility to the chain.

As is suggested by Figs. 6 and 7, the inner edges of the opening through the ball in the socket member may be provided with a bushing 7 to prevent wear on the wire or pipe passing through the alined opening.

As will be obvious, the chain may be put to a large number of uses, both as a guide and a protector, as it will be readily seen that through the described, limited, universal connection between each link and the alined openings through the same the wire, pipe or cable that is inclosed by said links will be thoroughly protected, and where a movement of the inclosed wire or pipe of the light, relative to the protector and guide is desired, the alined openings through the links permit the same to be readily obtained.

What I claim is:

1. A chain link having its ends provided, respectively, with an inwardly-projecting rounded surface, and an outwardly-projecting rounded surface, the outwardly-projecting rounded surface having its inner edge provided with oppositely-disposed recesses.

2. A chain link having its ends provided, respectively, with an inwardly-projecting rounded surface and an outwardly-projecting rounded surface, said outwardly-projecting rounded surface having its inner edge provided with oppositely-disposed recesses, and both of said rounded surfaces being provided with alined openings.

3. A chain comprising open links, each link provided with rounded ends, one of said ends projecting beyond its link and forming a socket member, said socket member having its inner edge provided with oppositely-disposed recesses, the other end projecting inwardly of its link and forming a ball member, said socket member and said ball member having openings through them which are in alinement, whereby when said links are assembled the ball member of one link engages with the socket member of the other link, and the recess of said socket engages with the end of the link carrying the ball member.

In testimony whereof I hereunto affix my signature in presence of two witnesses.

THOMAS J. WILLIAMS.

Witnesses:
ALVIN G. BELT,
L. C. DISMER.